United States Patent
Wang et al.

[15] 3,692,793
[45] Sept. 19, 1972

[54] 2,4-PYRIDINEDIYL BENZENESULFONATES

[72] Inventors: Chun-Shan Wang, 1906 Burlington; Thomas W. McGee, 615 Columbia, both of Midland, Mich. 48640

[22] Filed: Nov. 19, 1970

[21] Appl. No.: 91,142

Related U.S. Application Data

[62] Division of Ser. No. 807,961, March 17, 1969, Pat. No. 3,591,596.

[52] U.S. Cl. ........... 260/294.8 F, 260/239.6, 424/263
[51] Int. Cl. .............................................. C07d 31/48
[58] Field of Search .................... 260/294.8 F, 239.6

[56] References Cited

UNITED STATES PATENTS 3,475,440   10/1969   Kelyman ............. 260/294.8 F

Primary Examiner—Alan L. Rotman
Attorney—John L. Spalding et al.

[57] ABSTRACT

The invention relates to halogenated 6-methyl-4-pyridyl and 6-methyl-2,4-pyridinediyl esters of benzenesulfonic acid of the formulas

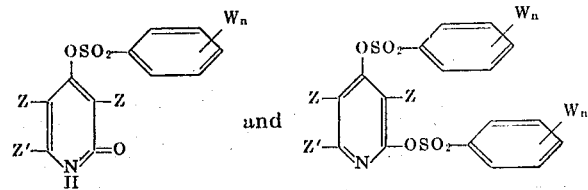

wherein each Z is hydrogen or X; X is chlorine, bromine or iodine; Z' is —CH$_3$, —CH$_2$X, —CHX$_2$ or —CX$_3$; W is a member selected from the group consisting of halogen, nitro and cyano and n is an integer of from 0 to 5, inclusive. The compounds of the invention are particularly useful as fungicides.

4 Claims, No Drawings

2,4-PYRIDINEDIYL BENZENESULFONATES

CROSS-REFERENCE TO RELATED APPLICATIONS

This application is a divisional of our copending application, Ser. No. 807,961 filed Mar. 17, 1969 now U.S. Pat. No. 3,591,596 dated July 6, 1971.

SUMMARY OF THE INVENTION

The present invention is directed to substituted pyridyl and pyridinediyl esters of benzenesulfonic acid. More particularly, it is directed to substituted benzenesulfonic acid: 1,2-dihydro-6-methyl-2-oxo-4-pyridyl ester and benzenesulfonic acid: 3,5-dihalo-6-methyl-2,4-pyridinediol diester compounds corresponding, respectively, to the formulas

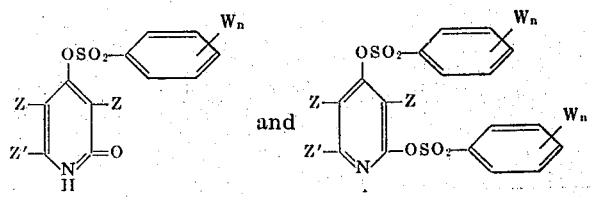

wherein each Z is hydrogen or X; X is chlorine, bromine or iodine; Z' is $-CH_3$, $-CH_2X$, $-CHX_2$ or $-CX_3$; W is a member selected from the group consisting of halogen, nitro and cyano and n is an integer of from 0 to 5, inclusive. The preferred compounds of the invention are those wherein X is chlorine.

The products of the present invention are normally white cubic crystals, white needles or white crystalline solids soluble in various organic solvents and of low solubility in water. The novel products are useful as fungicides.

The compounds of the invention may be prepared by reacting benzenesulfonyl chloride or a halo-, nitro- or cyano-benzenesulfonyl chloride with halogenated 4-hydroxy-6-methyl-2(1H)pyridone compounds. The latter compounds and their method of preparation are disclosed in application, Ser. No. 961,862 for "-Halogenated-4-Hydroxy-6-Methyl-2(1H)Pyridenes" by Wang and McGee, filed Mar. 17, 1969 of even date, now U.S. Pat. No. 3,637,722 dated Jan. 25, 1972. The reaction conveniently is carried out in the presence of an inert liquid reaction medium. Use of the inert liquid carrier is not critical, but it is preferred since it provides for better dispersion and contacting of the reactants. Representative suitable inert liquids include, for example, halogenated hydrocarbons such as methylene chloride, carbon tetrachloride and chloroform, benzene and toluene. Preferably, chloroform is employed as the inert liquid reaction medium. Triethylamine usually is added to the reaction mixture to absorb the hydrogen chloride evolved.

The reaction of benzenesulfonyl chloride reactant and 4-hydroxy-6-methyl-2-(1H)pyridone reactant is carried out at a temperature range of from about 50° C. to about 100° C. and is preferably conducted at from about 60° to 75° C. The reaction goes forward under pressures of a wide range; however, no particular advantage ordinarily results from the use of subatmospheric or superatmospheric pressures, and therefore, the preparation is ordinarily carried out at atmospheric pressure.

The amounts of the reactants to be employed are not critical, some of any of the desired products being formed when employing these in any proportions. However, the reaction consumes the reactants in the proportion of one mole of 4-hydroxy-6-methyl-2(1H)-pyridone reactant to one mole of benzenesulfonyl chloride reactant for each benzenesulfonate ester formed with the pyridone reactant. A suitable range for the ratio of reactants is 1:1 to 1:4 (4-hydroxy-6-methyl-2(1H)-pyridone:benzenesulfonyl chloride) and the employment of a 1:1 and 1:2 mole ratio of these reactants for the mono- and diester compounds, respectively, is preferred.

The pyridone compound reactant ordinarily is suspended in a mixture of chloroform and triethylamine with stirring. The benzenesulfonyl chloride is added while mixing continues and the resulting solution is refluxed. Ordinarily refluxing is continued for a period of from about 2 to about 20 hours, and preferably, from about 2 to about 10 hours. The pyridyl and pyridinediyl benzenesulfonate products can be recovered from the product mass and the separated product can be employed directly for the useful purposes of the present invention. If desired, the product can be further purified by conventional procedures before being so employed. Representative purification procedures include washing with an appropriate liquid which is a solvent for impurities but not for the product, recrystallization and the like.

DESCRIPTION OF THE PREFERRED EMBODIMENTS

The following examples further illustrate the present invention but are not to be construed as limiting the same.

EXAMPLE 1 BENZENESULFONIC ACID: 6-METHYL-2,4-PYRIDINE-DIYL ESTER

4-Hydroxy-6-methyl-2(1H)pyridone (10.7 grams; 0.1 mole) is suspended in a mixture of 300 milliliters of chloroform and 24.2 grams (0.2 mole) of triethylamine. The mixture is agitated at room temperature and 34.5 grams (0.2 mole) of benzenesulfonyl chloride is added while mixing continues. The resulting solution is refluxed at 65° C. for from 4 to 6 hours resulting in a clear pink solution. After cooling to room temperature, the solution is filtered and the solid residue remaining on the filter is discarded. The filtrate is successively washed with three 70-milliliter portions of water and then dried on a rotary evaporator. Two recrystallizations of the dried residue from an acetone-ethanol mixture give 16.5 grams (40 percent yield) of the ester product as white cubic crystals melting at from 54°–55° C. The infrared spectrum of the crystalline solid supports the proposed structure. Elemental analysis showed: C, 53.04 percent; H, 3.64 percent; N, 3.46 percent; S, 15.3 percent; calculated for

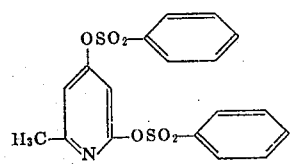

C, 53.33 percent; H, 3.7 percent; N, 3.46 percent; S, 15.8 percent.

EXAMPLE 2 BENZENESULFONIC ACID: 1,2-DIHYDRO-6-METHYL-2-OXO-4-PYRIDYL ESTER

By following the procedural steps of Example 1, benzenesulfonic acid: 1,2-dihydro-6-methyl-2-oxo-4-pyridyl ester is obtained by reacting together molar equivalents of 4-hydroxy-6-methyl-2(1H)pyridone, triethylamine and benzenesulfonyl chloride. The crude product is recrystallized twice from an acetone-ethanol mixture to give 41 percent yield of the ester as white needles melting at from 193°–195° C. Infrared and NMR spectra support the structure of the compound. Elemental analysis showed: C, 54.1 percent; H, 4.14 percent; N, 5.41 percent; calculated for

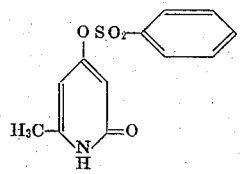

C, 54.34 percent; H, 4.15 percent; N, 5.28 percent.

EXAMPLE 3 BENZENESULFONIC ACID: p-CHLORO-, 1,2-DIHYDRO-6-METHYL-2-OXO-4-PYRIDYL ESTER

By following the procedural steps of Example 1, benzenesulfonic acid: p-chloro-, 1,2-dihydro-6-methyl-2-oxo-4-pyridyl ester is obtained by reacting together molar equivalents of 4-hydroxy-6-methyl-2-pyridone, triethylamine and p-chlorobenzenesulfonyl chloride. The desired product is purified by recrystallization from an acetone-ethanol mixture to obtain the ester in 39 percent yield as a white crystalline solid melting at from 173°–175° C. Infrared and NMR spectra support the structure of the compound. Elemental analysis showed: C, 47.9 percent; H, 3.29 percent; N, 4.5 percent; calculated for

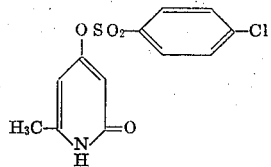

C, 48.08 percent; H, 3.34 percent; N, 4.67 percent.

EXAMPLE 4 BENZENESULFONIC ACID: DIESTER WITH 3,5-DICHLORO-6-METHYL-2,4-PYRIDINEDIOL

By following the procedural steps of Example 1, benzenesulfonic acid: diester with 3,5-dichloro-6-methyl-2,4-pyridinediol is obtained by reacting one molar equivalent of 3,5-dichloro-4-hydroxy-6-methyl-2(1H)-pyridone with benzenesulfonyl chloride (two molar equivalents) and triethylamine (two molar equivalents). The desired ester is obtained in 66 percent yield and is purified by recrystallization from an acetone-ethanol mixture. The product is a white crystalline solid melting at from 97°–98° C. Infrared and NMR spectra support the structure of the compound. Elemental analysis showed: C, 45.58 percent; H, 2.76 percent; N, 2.89 percent; calculated for

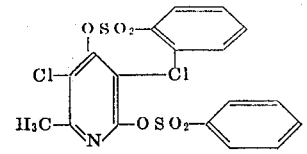

C, 45.57 percent; H, 2.74 percent; N, 2.95 percent.

EXAMPLE 5 BENZENESULFONIC ACID: o-NITRO-, DIESTER WITH 3,5-DICHLORO-6-METHYL-2,4-PYRIDINEDIOL

By following the procedural steps of Example 1, benzenesulfonic acid: o-nitro-, diester with 3,5-dichloro-6-methyl-2,4-pyridinediol is obtained by reacting one molar equivalent of 3,5-dichloro-4-hydroxy-6-methyl-2-pyridone with two molar equivalents of each of o-nitrobenzenesulfonyl chloride and triethylamine. The desired ester is obtained in 58 percent yield and is further purified by recrystallization from an acetone-ethanol mixture. The product is a white crystalline solid melting at from 197°–199° C. Infrared and NMR spectra support the structure of the compound. Elemental analysis showed: C, 38.33 percent; H, 2.11 percent; N, 7.35 percent; calculated for

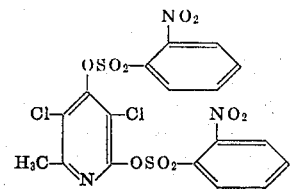

C, 38.3 percent; H, 1.95 percent; N, 7.45 percent.

In a manner similar to that described hereinbefore and following the procedures disclosed, 3,5-dichloro-4-hydroxy-6-methyl-2(1H)pyridone (one molar equivalent) is reacted with 2,4,6-trichlorobenzene-sulfonyl chloride (two molar equivalents) to provide 2,4,6-trichlorobenzenesulfonic acid: 3,5-dichloro-6-methyl-2,4-pyridinediyl ester having a molecular weight of 681.05.

Equimolar quantities of 4-hydroxy-6-methyl-2-pyridone and p-cyanobenzenesulfonyl chloride are reacted to provide p-cyanobenzenesulfonic acid: 1,2-dihydro-6-methyl-2-oxo-4-pyridyl ester having a molecular weight of 290.31.

3,5-Dichloro-4-hydroxy-6-methyl-2(1H)pyridone (one molar equivalent) is reacted with p-nitrobenzenesulfonyl chloride (two molar equivalents) to provide p-nitrobenzenesulfonic acid: 3,5-dichloro-6-methyl-2,4-pyridinediyl ester having a molecular weight of 564.36.

3,5-Dichloro-4-hydroxy-6-chloromethyl-2(1H)-pyridone (one molar equivalent) is reacted with o-nitrobenzenesulfonyl chloride (two molar equivalents) to provide o-nitrobenzenesulfonic acid: 3,5-dichloro-6-chloromethyl-2,4-pyridinediyl ester having a molecular weight of 598.81.

Further, in view of the foregoing disclosure and examples, one skilled in the art can prepare any of the embodiments of the disclosed invention.

The products of the present invention are useful as pesticides for the control of a variety of fungal pests such as, for example, tomato late blight and rice blast. For these uses, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils of solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 200 to 600 parts per million of one or more of the compounds.

In a representative operation, each of benzene-sulfonic acid: 1,2-dihydro-6-methyl-2-oxo-4-pyridyl ester and benzenesulfonic acid: 6-methyl-2,4-pyridine-diyl ester gives substantially complete control of rice blast fungus when one of the named compounds is separately applied at a concentration of 400 parts per million by weight to the environments containing and supporting thriving members of such fungus. In actual studies, host plants are wet with an aqueous solution or suspension of the chemical. Acetone or isopropanol, neither of which are toxic to the plants used, and wetting agents are usually added to the composition to give better dissolving and wetting characteristics, respectively. After the chemical has been applied, the plants are inoculated with the pathogen. They are then stored in conditions suitable for infection and development of the disease. When symptoms are well developed, the plants are graded for disease control. Untreated checks are rated as no control and the complete absence of disease symptoms as 100 percent control.

As indicated hereinbefore, the starting materials used in the synthesis of the pyridyl and pyridinediyl benzenesulfonate compounds of this invention are benzenesulfonyl chloride, triethylamine and 4-hydroxy-6-methyl-2(1H)pyridone compounds. The preparation of the latter compounds is disclosed in our copending application referred to in the Summary of the Invention. Benzenesulfonyl chloride and triethylamine are prepared in accordance with known aromatic substitution and amine formation procedures, respectively.

Various modifications can be made in the present invention without departing from the spirit or scope thereof for it is understood that we limit ourselves only as defined in the appended claims.

What is claimed is:

1. Substituted pyridinediyl esters of benzenesulfonic acid corresponding to the formulas

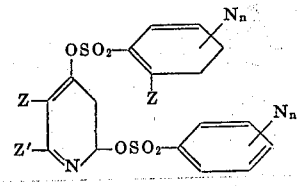

wherein each Z is hydrogen or X; X is chlorine, bromine or iodine; Z' is —CH₃, —CH₂X, —CHX₂ or —CX₃; W is a member selected from the group consisting of halogen, nitro and cyano; and n is an integer of from 0 to 5, inclusive.

2. The pyridinediyl ester claimed in claim 1 which is benzenesulfonic acid: 6-methyl-2,4-pyridinediyl ester.

3. The pyridinediyl ester claimed in claim 1 which is benzenesulfonic acid: diester with 3,5-dichloro-6-methyl-2,4-pyridinediol.

4. The pyridinediyl ester claimed in claim 1 which is benzenesulfonic acid: o-nitro-, diester with 3,5-dichloro-6-methyl-2,4-pyridinediol.

* * * * *

UNITED STATES PATENT OFFICE
CERTIFICATE OF CORRECTION

Patent No. 3,692,793          Dated September 19, 1972

Inventor(s) Chun-Shan Wang & Thomas W. McGee

It is certified that error appears in the above-identified patent and that said Letters Patent are hereby corrected as shown below:

In the Abstract, formulas should be formulae.

In Column 1, line 17, formulas should be formulae.

In column 1, line 40, cyano-benzenesulfonyl should be cyanobenzenesulfonyl.

In Column 1, line 44, Pyridenes should be Pyridones.

In Column 4, lines 5-10, the formula should be:

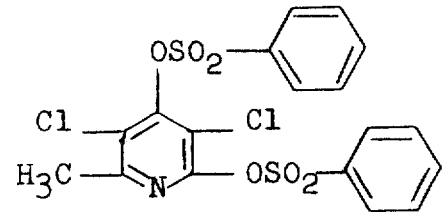

In Colunn 5, line 12, of should be or.

In Column 6, (Claim 1) the formula should be:

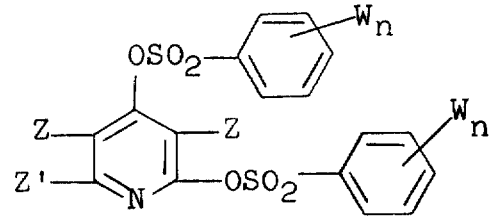

Signed and sealed this 10th day of April 1973.

(SEAL)
Attest:

EDWARD M. FLETCHER, JR.
Attesting Officer

ROBERT GOTTSCHALK
Commissioner of Patents